(12) United States Patent
Maurer (10) Patent No.: US 7,379,598 B2
(45) Date of Patent: May 27, 2008

(54) DISTANCE SORTING ALGORITHM FOR MATCHING PATTERNS

(75) Inventor: Donald E. Maurer, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 645 days.

(21) Appl. No.: 10/928,286

(22) Filed: Aug. 27, 2004

(65) Prior Publication Data

US 2005/0047661 A1 Mar. 3, 2005

Related U.S. Application Data

(60) Provisional application No. 60/499,194, filed on Aug. 29, 2003.

(51) Int. Cl.
*G06K 9/62* (2006.01)
(52) U.S. Cl. ....................................................... 382/209
(58) Field of Classification Search ................. 382/209, 382/218, 219
See application file for complete search history.

(56) References Cited

U.S. PATENT DOCUMENTS

| 4,891,762 | A  | * | 1/1990 | Chotiros ..................... 701/223 |
| 6,272,231 | B1 | * | 8/2001 | Maurer et al. .............. 382/103 |
| 6,687,402 | B1 |   | 2/2004 | Taycher et al. |

* cited by examiner

*Primary Examiner*—Matthew C. Bella
*Assistant Examiner*—Randolph Chu
(74) *Attorney, Agent, or Firm*—Aisha Ahmad

(57) ABSTRACT

The invention provides methods and systems for performing a matching function between a first pattern and a second pattern. This technique involves creating a set of all distance measurements between pairs of points in the first pattern and all distance measurements between pairs of points in the second pattern. This set is then partitioned into subsets of nearly equal distance elements. Those subsets containing at least one element derived from each pattern determine possible line segment matches which are then analyzed mathematically to determine the partial transform that maps the associated points of the first pattern into the points of the second pattern. The resulting set of partial transforms is then reviewed to determine matched line segments between the two patterns.

10 Claims, 5 Drawing Sheets

| Line Segments (p entries underlined) | Distance Measure Δ (p entries underlined) |
|---|---|
| 12 | 4.4 |
| 13 | 2.8 |
| 14 | 2.0 |
| 15 | 3.2 |
| 16 | 6.4 |
| 17 | 5.0 |
| 23 | 2.0 |
| 24 | 4.0 |
| 25 | 5.0 |
| 26 | 2.2 |
| 27 | 4.1 |
| 34 | 2.0 |
| 35 | 3.2 |
| 36 | 3.6 |
| 37 | 3.2 |
| 45 | 1.4 |
| 46 | 5.3 |
| 47 | 3.2 |
| 56 | 6.1 |
| 57 | 2.8 |
| 67 | 4.2 |
| <u>12</u> | 2.0 |
| <u>13</u> | <u>3.2</u> |
| <u>23</u> | 1.4 |

Fig. 4a

| Sorted Δ's in Ascending Order | | |
|---|---|---|
| <u>1.4</u> | 1.4 | 2.0 |
| 2.0 | 2.0 | <u>2.0</u> |
| 2.2 | 2.8 | 2.8 |
| <u>3.2</u> | 3.2 | 3.2 |
| 3.2 | 3.2 | 3.3 |
| 4 | 4.1 | 4.2 |
| 4.4 | 5.0 | 5.0 |
| 5.3 | 6.1 | 6.4 |

DISTANCE SORTING ALGORITHM FOR MATCHING PATTERNS

CROSS-REFERENCE TO RELATED APPLICATIONS

This application claims priority to U.S. Provisional Application No. 60/499,194, filed Aug. 29, 2003, the entire contents and substance of which are hereby incorporated in total by reference.

STATEMENT OF GOVERNMENTAL INTEREST

This invention was made with Government support under Contract No. N00024-98-D-8124 awarded by the Department of the Navy. The Government has certain rights in the invention.

FIELD OF THE INVENTION

The present invention relates to a pattern matching method; in particular, a method for matching these patterns by mathematically correlating sets of object state vectors contained in the respective patterns.

BACKGROUND OF THE INVENTION

Many pattern matching problems can be formulated in terms of finding similar distributions in two point sets. For instance, in star tracking a library template is matched to the star detections on a sensor's focal plane to establish spacecraft attitude. In various other pattern matching applications where such discrete points are not directly obtained, feature points of the input patterns are first obtained using well-known prior art techniques. One example of which is fingerprint identification, where minutia points are derived from a latent fingerprint. These minutia points are then used to attempt a match of the latent fingerprint with a file print.

Not all comparisons are performed against a stored template. Numerous applications require that a match be performed between patterns obtained by separate system sensors thereby increasing problems associated with measurement errors. By way of example, in tracking and surveillance applications, point-set matching, or correlation, is critical to determining whether multiple sensors are seeing the same objects. A common technique for correlating two point sets is least-cost assignment, such as the Munkres or Jonker-Vollgenant-Castenanon algorithm. With this approach, the cost of associating pairs of points, one from each set, is either the Euclidean or Mahalanobis distance ($\chi^2$-statistic). Thus, the best correlation solution is one that minimizes the sum of the distances between associated pairs.

This approach works well in many cases and can be applied if the sets consist of unequal numbers of points. However, there are serious limitations. It is necessary to first estimate the bias or offset between the two sets, substantially increasing the algorithm's complexity—especially if the bias has a rotation component. For example, aligning reconnaissance photos usually requires translations and rotation, and possibly scaling. Typically, such prior art algorithms also force each point in the smaller set to correlate with some point in the larger set. These forced associations may not be valid. For instance, there is no guarantee that two sensors surveying the same region will detect the same objects. Another limitation with many correlation algorithms is their limited ability to handle errors in estimating an object's location. As a consequence correlated points may not align exactly. Finally, multiple alignments may exist, indicating a degree of ambiguity that could cast suspicion on the validity of any single solution. In the extreme, any two points could be correlated if the allowable error is large enough. Further, since a typical least-cost assignment algorithm will stop with the first solution it finds, the user may never suspect the poor quality of the correlation. This is particularly critical in coordinated surveillance systems where tracks from multiple sensors must be associated with a high degree of reliability.

The Distance-Sort algorithm of the present invention circumvents these limitations. With the present invention bias estimation is a consequence of the correlation solution and not a necessary first step. The present invention's Distance-Sort is robust to missing data and sensor errors, finding all the possible alignments given the allowable error.

SUMMARY OF THE INVENTION

The present invention uses a distance sorting technique to perform a matching function between a first pattern and a second pattern. In one embodiment of the invention this technique involves creating a set of all distance measurements between pairs of points in the first pattern and all distance measurements between pairs of points in the second pattern. This set is then partitioned into subsets of nearly equal distance elements. Those subsets containing at least one element derived from each pattern determine possible line segment matches.

In additional embodiments of the invention each of such possible matches are then analyzed mathematically to determine the partial transform that maps the associated points of the first pattern into the points of the second pattern. That is, such a partial transform is calculated for each of the line segments that were determined to be approximately equal in length. The resulting set of partial transforms is then reviewed. In particular, the invention then seeks a specific optimal transform that maps the most pairs of points of the first pattern into pairs of points in the second pattern. The pairs of points associated with that optimal transform will be the matched line segments.

In further embodiments of the invention some limitations are imposed on the points in each pattern that are to be considered. By way of example, in patterns involving stars, only stars of a minimum magnitude would be considered. In an additional example involving fingerprint analysis, points would be classified as bifurcation points or ridge ending points. Pattern matching would then proceed between only those points contained in a like class.

BRIEF DESCRIPTION OF THE DRAWINGS

Various embodiments of the present invention will now be described in detail in conjunction with the annexed drawings, in which:

FIG. 3b illustrates a sort of the data of FIG. 3a;

FIG. 4b illustrates a sort of the data of FIG. 4a; and,

BACKGROUND TERMINOLOGY

Figure 1:
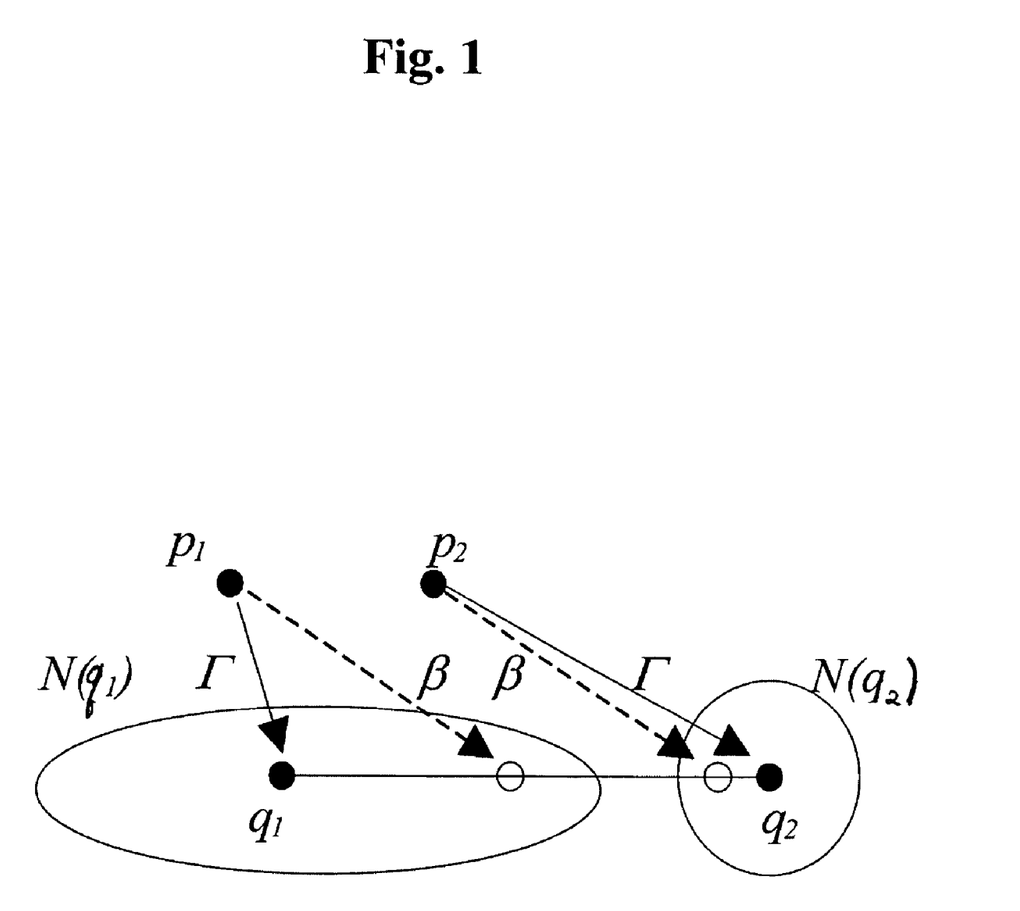
FIG. 1 is a diagram illustrating two sets of points to be compared and various mathematical terms being used by the present invention in performing that comparison.

The purpose of this section is to formalize the correlation problem inherent in the matching function and to establish notation. Let P and Q be finite point-sets of the same cardinality, and as illustrated in FIG. 1, assume that each point $q \in Q$ has an associated neighborhood N(q). Let N={N(q):$q \in Q$}. This neighborhood system may, for example, represent measurement errors. If there is a rigid transform (i.e., translation and rotation), β, such that for each $p \in P$, there is a unique point $q \in Q$ such that $\beta(p) \in N_q(q)$, the mapping $\Gamma: P \rightarrow Q$ defined by $\Gamma(p)=q$ will be called an N-correlation.

Now, assume P and Q are arbitrary point sets, not necessarily the same cardinality. If $P_i \subseteq P$, $Q_i \subseteq Q$, and there exists an N-correlation $\Gamma_i: P_i \rightarrow Q_i$, the triple, $S_i = (\Gamma_i, P_i, Q_i)$ is a correlation solution. Moreover, the solution is maximal if there is no other solution, $S_j$, such that $P_j \supset P_i$, $Q_j \supset Q_i$, and $\Gamma_j = \Gamma_i$ on $P_i$. The present invention addresses the general correlation problem of finding all maximal correlation solutions. Moreover it performs this function in a manner that overcomes the above discussed problems associated with the prior art.

If there are no measurement errors (i.e., N(q)=q for every element, q, in Q), the bias β=Γ. In general this is not the case, and the estimated bias is the rigid transformation closest to Γ in the following sense. If $d^2(u, v)$ denotes the squared distance between the points u, and v, the smaller the cost function $$c(\beta, P_i, Q_i) = \frac{1}{|P_i|} \sum_{p \in P} d^2(\beta(p), \Gamma_i(p))$$

is the smaller the difference between β and Γ. Therefore, a rigid transform that minimizes this cost is a bias estimate and can be computed as follows. Represent a point $z = (z_x, z_y)$ in complex form as $z = z_x + i z_y$, then the action of β can be expressed as $\beta(z) = az + b$ where a and b are complex numbers; and $$c(\beta, P, Q) = \frac{1}{|P|} \sum_{p \in P} |ap + b - \Gamma(p)|^2.$$

Thus, bias estimation reduces to finding a and b that minimize c(β, P, Q). This is a standard least squares minimization whose solution is $$\begin{bmatrix} a \\ b \end{bmatrix} = \frac{1}{|P|\sum|p|^2 - |\sum p|^2} \begin{pmatrix} |P| & -\sum \overline{p} \\ -\sum p & \sum|p|^2 \end{pmatrix} \begin{bmatrix} \sum \Gamma(p)\overline{p} \\ \sum \Gamma(p) \end{bmatrix},$$

where the summations run over elements of P.

DETAILED DESCRIPTION

Figure 2:
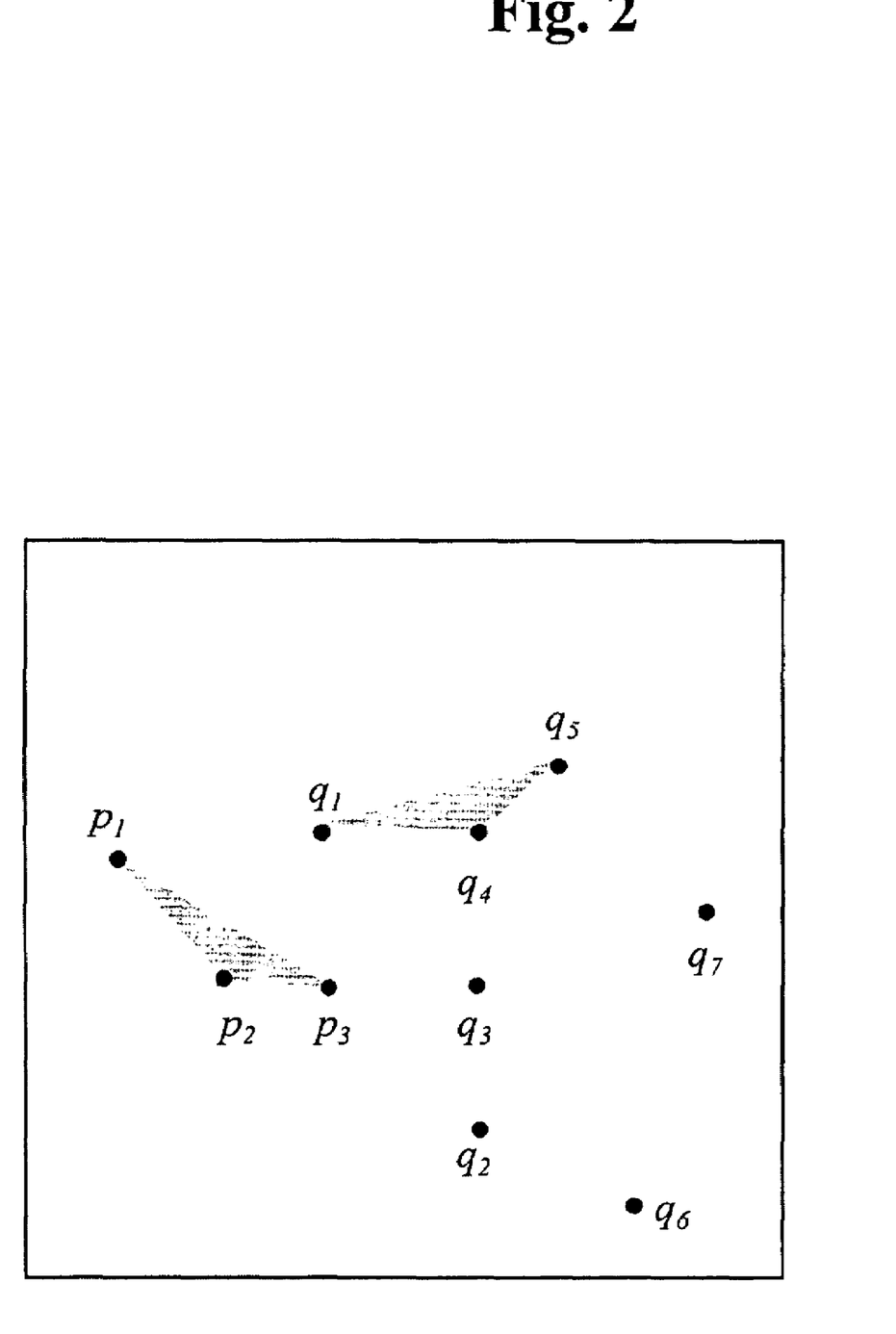
FIG. 2 is a diagram showing two sets of data for which an exact correlation is present between an indicated object found in each set.

The present invention attempts to match patterns contained in two sets of data. FIG. 2 illustrates a simple example in which these two sets of data correspond to points p's and q's, respectively. In particular, an attempt is made to match the shaded object defined by points $p_1$, $p_2$ and $p_3$ with its counterpart in the q set.

Sorting Algorithm

In performing this matching function, the present invention relies on a sorting algorithm which will now be discussed. Any set, $\Delta = \{\delta_1, \delta_2, \ldots \delta_M\}$, of real numbers can be decomposed into a union of subsets, $$\Delta = \bigcup_k \Delta_k,$$

where each $\Delta_k$ consists of all the numbers equal to a given number. This decomposition can be found by sorting Δ in ascending order $$\delta_{\pi(1)} = \delta_{\pi(2)} = \cdots = \delta_{\pi(i_1)} < \delta_{\pi(i_1+1)} = \cdots = \delta_{\pi(i_2)} < \cdots$$
$$< \delta_{\pi(i_{m-1}+1)} = \cdots = \delta_{\pi(M)},$$

where π denotes the resulting permutation of the index set $I_\Delta = \{1, 2, \ldots, M\}$. Then each $\Delta_k = \{\delta_{\pi(i_{k-1}+1)}, \ldots \delta_{\pi(i_k)}\}$. Alternatively, this decomposition can be expressed in terms of index sets:

$$I_\Delta = \bigcup_k I_k,$$

where $I_k = \{\pi(i_{k-1}+1), \ldots, \pi(i_k)\}$.

The generalized sorting algorithm of the present invention extends this decomposition to approximate equality. For each $\delta_i \in \Delta$ let $\epsilon_i \geq 0$ be an allowable error magnitude, then $\delta_i$ is approximately equal to $\delta_j$ (written $\delta_i \approx \delta_j$) if the intersection of the intervals $[\delta_i - \epsilon_i, \delta_i + \epsilon_i]$ and $[\delta_j - \epsilon_j, \delta_j + \epsilon_j]$ is non-empty. Consider the folling example of data presented in Table 1:

TABLE 1

| Sample Δ with Associated Errors | | | | | | | | | |
|---|---|---|---|---|---|---|---|---|---|
| $\delta_i$ | 2 | 4 | 7 | 4 | 9 | 13 | 4 | 7 | 7 | 10 |
| $\epsilon_i$ | 1 | 1 | 2 | 1 | 1 | 6 | 2 | 1 | 3 | 9 |

Figure 3A:
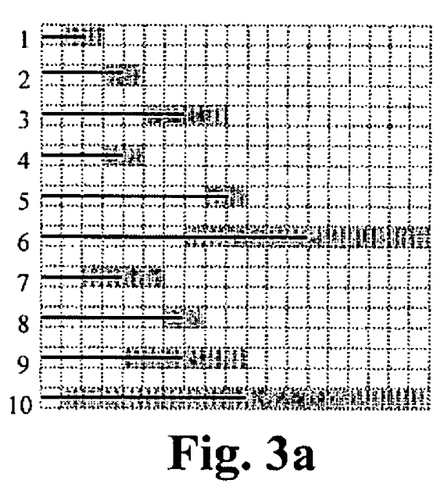
FIG. 3a graphically illustrates a set of distance measures with associated errors.
Figure 3B:
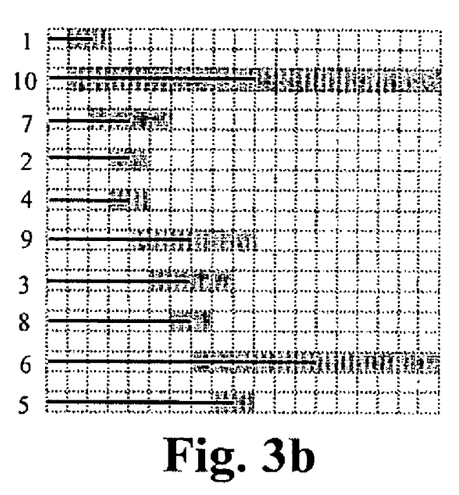

FIG. 3a represents the elements of Δ as a stack of horizontal line segments, with associated error neighborhoods delineated in gray. In FIG. 3b these segments have been sorted according to increasing values of their lower error bounds. The largest subsets of approximately equal elements can be read off this diagram:

$I_1 = \{1,2,4,7,10\}$, $I_2 = \{2,3,4,7,9,10\}$, $I_3 = \{3,7,8,9,10\}$, and $I_4 = \{3,5,6,8,9,10\}$.

The generalized sorting algorithm proceeds as follows. Set $$U = \{\delta_1 - \epsilon_1, \delta_2 - \epsilon_2, \ldots, \delta_M - \epsilon_M, \delta_1 + \epsilon_1, \delta_2 + \epsilon_2, \ldots, \delta_M + \epsilon_M\};$$

and let $\Im(U)$ denote the set obtained by sorting the elements of U into ascending order, and π the resulting permutation of the indices. Further, let $i_1 < i_2 < \ldots < i_M$ be the indices in $I_{\Im(U)}$ for which $\pi^{-1}(i_k) > M$. The index sets are constructed by applying the recursion:

```
k = 1
I₁ = π⁻¹ {2, 3, ..., i₁}
for l = 2 : M
    if i_l = i_{l-1} + 1
        I_k = I_k ∪ π⁻¹ {i_l};
    else
        k = k + 1
        I_k = I_{k-1} ∪ π⁻¹ {i_{l-1} + 1, ..., i_l}
        I_k = I_k \ π⁻¹ {i_1, ..., i_{l-1}}
        I_k = I_k \ {π⁻¹ {i_l} − M}
    end
end
Reduce each I_k by subtracting M from indices greater than M.
```

The last step in the inner loop reduces indices that appear twice. That is, $\pi(i_l) - M$ is always in the previous $I_k$ (for example, $\pi(1) = \pi(i_l) - M$). However, $I_k$ may also contain $\pi(i_l)$. Therefore, if one of these elements is not removed, $I_k$ could contain the same index twice.

The Distance-Sort Algorithm of the Present Invention

Once the data associated with the patterns to be matched has been processed by the above described sorting algorithm, the actual distance-sort algorithm of the present invention is performed.

Some additional terminology will now be defined. A similarity transform, $\tau$, is uniquely determined by a pair of complex numbers $(a, b)$, where the action of $\tau$ is defined by $\tau(z) = az + b$. In polar form, $a = re^{i\theta}$, and, thus, $a$ scales by $r$ and rotates through angle $\theta$ ($\tau$ is rigid if and only if $r = 1$). Adding $b$ translates the result. As shown below, $\tau$ is uniquely determined by its action on any directed line segment $p = (p_1, p_2)$, since $$a = \frac{\tau(p_1) - \tau(p_2)}{p_1 - p_2} \text{ and } b = \frac{p_1 \tau(p_2) - p_2 \tau(p_1)}{p_1 - p_2}.$$

Conversely, given two line segments $p$ and $q$, there is a unique similarity transform, $\tau$, called a partial transform, such that $\tau(p) = q$. The notation $\tau = \tau(p; q) = \tau(p_1, p_2; q_1, q_2)$ is used to indicate the defining line segments. It should be noted that $\tau(p; q)$ is rigid if and only if $p$ and $q$ are of the same length. If $p^r = (p_2, p_1)$ denotes the segment directed opposite to $p$, then $\tau(p^r; q^r) = \tau(p; q)$. Moreover, $\tau(p; q)$ is rigid if and only if $\tau(p; q^r)$ is rigid.

An embodiment of the present invention will now be applied to the example depicted in FIG. 2—where an exact correlation is possible between the two depicted shaded areas. The triangle $(p_1, p_2, p_3)$ can be mapped to the triangle $(q_1, q_4, q_5)$ by a rigid transformation. Consequently, the partial transforms $\tau(p_1, p_2; q_1, q_4)$ $\tau(p_2, p_3; q_4, q_5)$ $\tau(p_3, p_1; q_5, q_1)$ are identical to the optimal transform. In this embodiment of the invention, correlation solutions are determined by searching for this kind of cluster in the set of all rigid partial transforms, $\tau = \tau(p; q)$, where $p$ is from $P$ and $q$ is from $Q$.

Figure 4A:
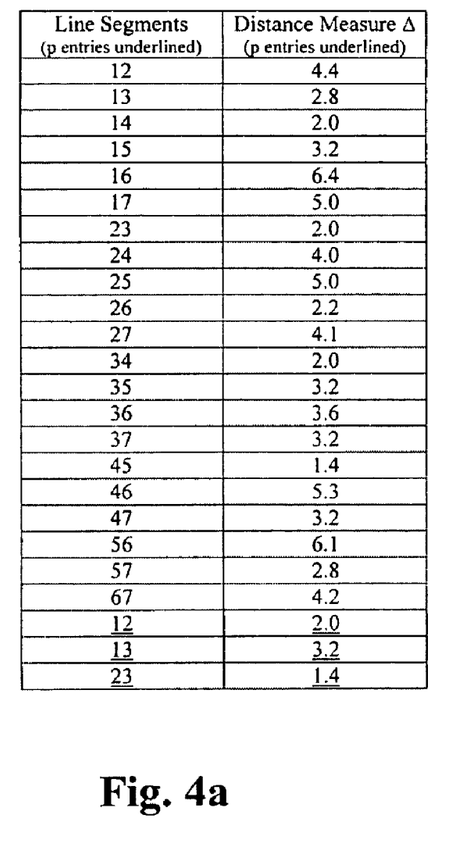
FIG. 4a is a table of line segment measurements associated with the data of FIG. 2.

In analyzing the data of FIG. 2 the above described sorting algorithm is first employed. That is, the algorithm determines $\Delta(P)$, the set of segment lengths for all pairs of points in $P$, and similarly determines $\Delta(Q)$. Let $\Delta = \Delta(P) \cup \Delta(Q)$. FIG. 4a displays the results of this analysis, where for example, the data entries appearing in the first row of the table represent the distance ("4.4") of the line segment between points $q_1$ and $q_2$ (identified as "12" in the first column). Table entries relating to points in P are underlined.

Figure 4B:
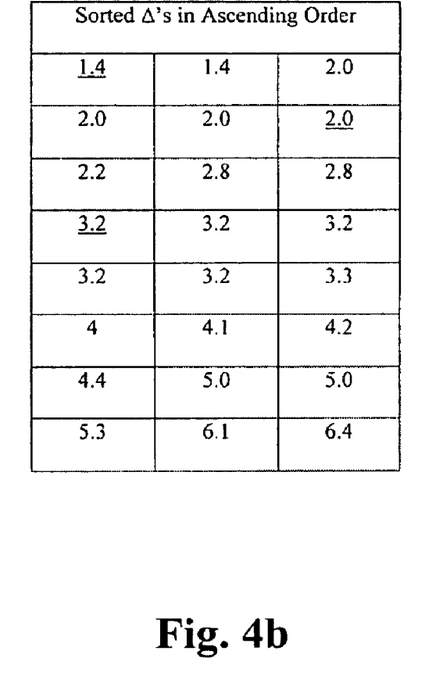

These $\Delta$ entries of FIG. 4a are then sorted to obtain the decomposition $$\Delta = \bigcup_k \Delta_k,$$

keeping track of the points associated with each difference vector. FIG. 4b illustrates the results of this analysis where the elements of the $\Delta$ are listed in ascending order and where the underline indicates lengths derived from P (although note illustrated, the associated points corresponding to each of the distance measures are maintained). At this point only the $\Delta_k$ containing segment lengths from both P and Q need be further considered, since the partial transforms are defined by these paired segments. In this example, these $\Delta_k$ correspond to the three segment lengths 1.4, 2, and 3.2.

In this embodiment of the invention, partial transforms are then derived from these sets. These results are listed in Table 2 below:

TABLE 2

| Index | τ | A | b |
|---|---|---|---|
| 1 | τ(p₂, p₃; q₄, q₅)* | 0.6428 + 0.7660i | 3.0000 + 3.0000i |
| 2 | τ(p₂, p₃; q₅, q₄) | −0.6428 + 0.7660i | 2.0000 + 2.0000i |
| 3 | τ(p₁, p₂; q₁, q₄)* | 0.6428 + 0.7660i | 3.0000 + 3.0000i |
| 4 | τ(p₁, p₂; q₄, q₁) | −0.7660 + 0.6428i | 1.0000 + 1.0000i |
| 5 | τ(p₁, p₂; q₂, q₃) | −0.7660 + 0.6428i | 1.0000 + 3.0000i |
| 6 | τ(p₁, p₂; q₃, q₂) | −0.6428 − 0.7660i | −1.0000 + 1.0000i |
| 7 | τ(p₁, p₂; q₃, q₄) | 0.7660 − 0.6428i | 3.0000 − 3.0000i |
| 8 | τ(p₁, p₂; q₄, q₃) | 0.7660 + 0.6428i | 3.0000 − 1.0000i |
| 9 | τ(p₁, p₃; q₁, q₅)* | 0.6428 + 0.7660i | 3.0000 + 3.0000i |
| 10 | τ(p₁, p₃; q₅, q₁) | −0.2272 + 0.9739i | 3.0000 + 3.0000i |
| 11 | τ(p₁, p₃; q₃, q₅) | 0.6428 + 0.7660i | 5.0000 + 1.0000i |
| 12 | τ(p₁, p₃; q₅, q₃) | 0.9739 + 0.2272i | 5.0000 + 1.0000i |
| 13 | τ(p₁, p₃; q₃, q₇) | −0.6428 + 0.7660i | 0.0000 + 2.0000i |
| 14 | τ(p₁, p₃; q₇, q₃) | 0.2272 − 0.9739i | 2.0000 − 0.0000i |
| 15 | τ(p₁, p₃; q₄, q₇) | −0.6428 − 0.7660i | 2.0000 − 0.0000i |
| 16 | τ(p₁, p₃; q₇, q₄) | −0.9739 − 0.2272i | 2.0000 + 2.0000i |

The partial transform clusters corresponding to correlation solutions can be found by partitioning the real and imaginary parts of columns a and b, into equal-value subsets as follows. First, partition the real part of column a. Thus, for the example this yields:

$I_\Delta = \{1, 3, 9, 11\} \cup \{2, 6, 13, 15\} \cup \{4, 5\} \cup \{7, 8\} \cup \{10\} \cup \{12\} \cup \{14\} \cup \{16\}$.

Next, a partitioning is performed on these component subsets based on the imaginary part of a. In the example, none of these subsets are further subdivided. Repeating the procedure for the b column, partitioning based on the real part gives:

$I_\Delta \{1, 3, 9\} \cup \{11\} \cup \{2, 15\} \cup \{6\} \cup \{13\} \cup \{4, 5\} \cup \{7, 8\} \cup \{10\} \cup \{12\} \cup \{14\} \cup \{16\}$;

and after partitioning based on the imaginary part, the index set decomposes into $I_\Delta = \{1, 3, 9\} \cup \{2\} \cup \{4\} \cup \{5\} \cup \{6\} \cup \{7\} \cup \{8\} \cup \{10\} \cup \{11\} \cup \{12\} \cup \{13\} \cup \{14\} \cup \{15\} \cup \{16\}$.

The index set $I_1 = \{1, 3, 9\}$ corresponds to the cluster of three identical partial transforms, denoted by $\tau_1$, but derived from different line segment pairs. If $P_1$ is the set of all endpoints of line segments in P occurring in the definition of these partial transforms, and, similarly, $Q_1$ is the set of all endpoints of defining line segments in Q, then $$\tau_i(z)=(0.6428+0.7660i)z+(3.0000+3.0000i)$$

$$P_i=\{p_1, p_2, p_3\}$$

$$Q_i=\{q_1, q_4, q_5\}.$$

Thus, $S_1=(\tau_1, P_1, Q_1)$ is the 3-point correlation solution (asterisks in Table 2 indicate the cluster corresponding to this solution). In this way the correlation solutions are in a one-to-one correspondence with the index sets in the decomposition of $I_A$. Although the singleton sets (e.g., the last row of Table 2 representing index 16) determine solutions that map two points in P into two points in Q, these are generally trivial and can be excluded by specifying that a solution must have at least a minimum number of correlated points.

Figure 5A:
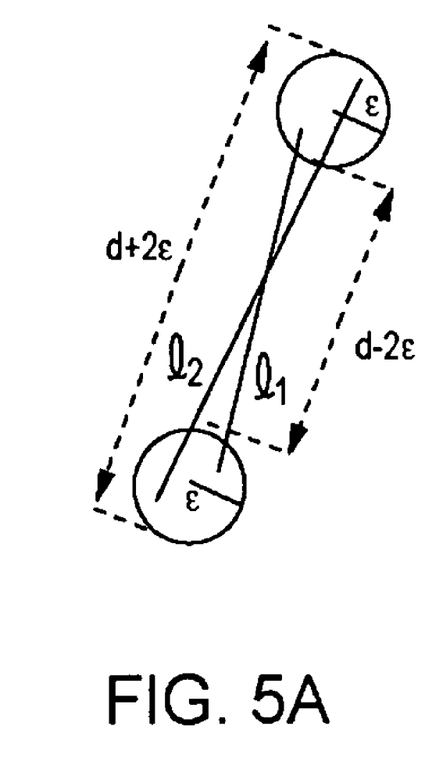
FIGS. 5a and 5b illustrate mathematical terms used in a comparison performed by the present invention when error measurements are introduced.

In further embodiments of the invention this approach can be generalized to N-correlations where the error neighborhoods are circular with radius $\epsilon$. That is, the method just illustrated is extended to situations where line segments are approximately equal. In these additional embodiments this approximate equality is given an appropriate meaning based on an $\epsilon$. Thus as indicated in FIG. 5a, any pair of line segments, $l_1$ and $l_2$ beginning and ending in circles of radius $\epsilon$ are approximately equal. Accordingly, the error neighborhoods for the sort on line segment lengths are intervals of length $4\epsilon$.

In these embodiments, as before, the generalized sorting algorithm is applied, all approximately equal-length pairs are identified, and the set of partial transforms $\tau=\tau(p; q)$ are constructed. It should be noted in such cases the partial transforms are not necessarily rigid because they map approximately equal segments to one another (however, they are close to being rigid).

Figure 5B:
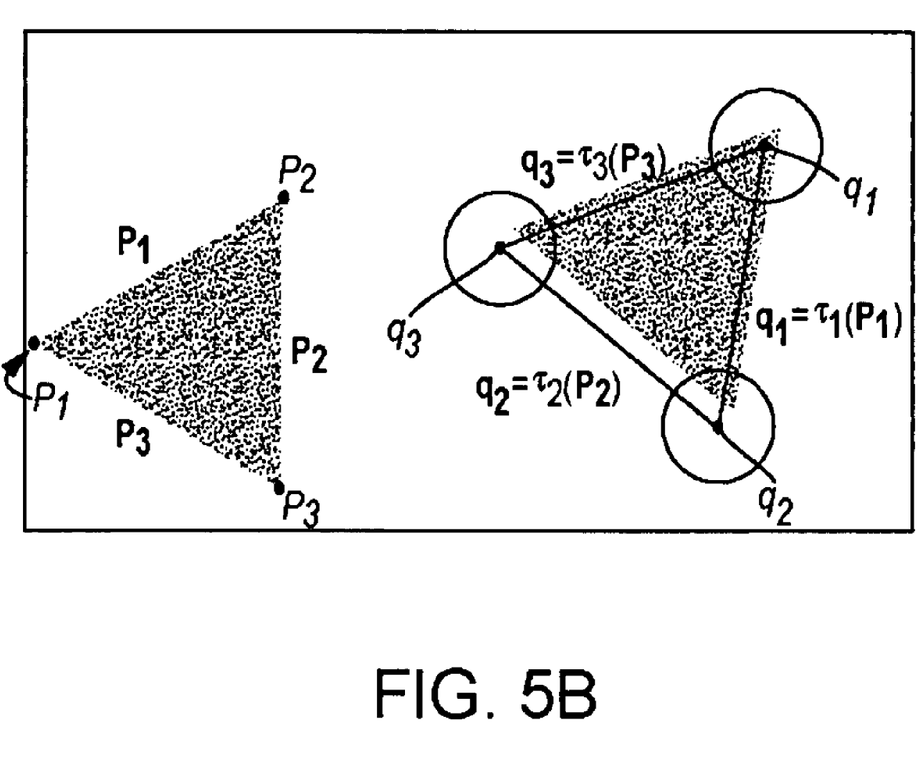

In the example depicted in FIG. 5b, suppose the left-most triangle in FIG. 5b (whose vertices $p_1, p_2$ and $p_3$ correspond to points in P) can be rotated and translated into the solid triangle shown in the right half of FIG. 5b in such a way that its vertices lie in the error neighborhoods corresponding to the vertices of a triangle (black-line) in Q. Then the partial transforms $\tau_i$, (i=1,2,3) defined in FIG. 5b form a cluster of approximately equal partial transforms. All such clusters can be found by applying the generalized sorting algorithm to a and b with appropriately chosen error neighborhoods, as described above.

While the above examples used to illustrate the invention have addressed simple patterns involving triangles, the invention is not so limited. That is, objects defined by any number of points can be compared with the present invention. Further, while the invention has been described with reference to the preferred embodiment thereof, it will be appreciated by those of ordinary skill in the art that modifications can be made to the structure and elements of the invention without departing from the spirit and scope of the invention as a whole.

What is claimed is:

1. A pattern matching method for performing a comparison of a first pattern with a second pattern, said method comprising the steps of:

obtaining a first set of points in the first pattern and a second set of points in the second pattern;

creating a set of distance measurements of line segments formed between at least some of possible pairs of points in the first set and at least some of possible pairs of points in the second set;

partitioning the distance measurement set into subsets of approximately equal distance elements where each subset contains at least one element derived from each pattern;

determining possible line segment matches from each of said subsets; and utilizing said possible line segment matches to determine a result of said comparison and mathematically analyzing each of the elements in a subset to determine a collection of partial transforms, where each said partial transform maps an associated pair of points of the first pattern into a pair of points of the second pattern; and, repeating said analyzing step for each subset wherein each determined collection of partial transforms is combined to yield a total set of partial transforms and reviewing the total set of partial transforms to determine a specific optimal transform that maps the most pairs of points of the first pattern into pairs of points in the second pattern; and, further determining that each pair of points in the first pattern mapped by said specific optimal transform into a pair of points in the second pattern corresponds to the possible line segment matches, wherein the elements of said total set of partial transforms contains both real and imaginary parts and where said reviewing step further comprises analyzing these parts separately.

2. The method of claim 1, wherein said determining step further comprises concluding no optimal partial transform exists if said most pairs of mapped points of any partial transform does not attain some minimum number.

3. The method of claim 1, wherein said determining step further comprises: analyzing the total set of partial transforms to determine a specific optimal transform; and, determining that each pair of points in the first pattern mapped by said optimal transform into a pair of points in the second pattern corresponds to matched line segments.

4. The method of claim 3 wherein said analyzing step comprises performing a least squares minimization analysis.

5. The method of claim 1 wherein at least one of the patterns comprises a stored template.

6. The method of claim 1 wherein at least one of the patterns is obtained by a sensor device.

7. The method of claim 1 wherein said obtaining step comprises determining feature points from at least one of the patterns.

8. A computer-readable medium, comprising instructions for performing a comparison of a first pattern with a second pattern, said method comprising:

obtaining a first set of points in the first pattern and a second set of points in the second pattern; creating a set of distance measurements of line segments formed between at least some of possible pairs of points in the first set and at least some of possible pairs of points in the second set;

partitioning the distance measurement set into subsets of approximately equal distance elements where each subset contains at least one element derived from each pattern;

determining possible line segment matches from each of said subsets mathematically analyzing each of the elements in a subset to determine a collection of partial transforms, where each said partial transform maps the associated pair of points of the first pattern into a pair of points of the second pattern; and, repeating said analyzing step for each subset wherein each determined collection of partial transforms is combined to yield a total set of partial transforms and reviewing the total set of partial transforms to determine a specific optimal transform that maps the most pairs of points of the first pattern into pairs of points in the second pattern; and, determining that each pair of points in the first pattern mapped by said specific optimal transform into a pair of points in the second pattern corresponds to the possible line segment matches; and utilizing said possible line segment matches to determine a result of said comparison, wherein the elements of said total set of partial transforms contains both real and imaginary parts and where said reviewing step further comprises analyzing these parts separately.

9. The computer-readable medium of claim 8, wherein said determining step further comprises: analyzing the total set of partial transforms to determine a specific optimal transform; and, determining that each pair of points in the first pattern mapped by said optimal transform into a pair of points in the second pattern corresponds to matched line segments.

10. The computer-readable medium of claim 9 wherein said analyzing step comprises performing a least squares minimization analysis.

* * * * *